US009936530B2

(12) United States Patent
Stojanovski

(10) Patent No.: US 9,936,530 B2
(45) Date of Patent: Apr. 3, 2018

(54) SYSTEMS, METHODS, AND DEVICES FOR DEVICE-TO-DEVICE RELAY COMMUNICATION

(71) Applicant: Intel IP Corporation, Santa Clara, CA (US)

(72) Inventor: Alexandre S. Stojanovski, Paris (FR)

(73) Assignee: INTEL IP CORPORATION, Santa Clara, CA (US)

( * ) Notice: Subject to any disclaimer, the term of this patent is extended or adjusted under 35 U.S.C. 154(b) by 74 days.

(21) Appl. No.: 14/835,944

(22) Filed: Aug. 26, 2015

(65) Prior Publication Data

US 2016/0270134 A1 Sep. 15, 2016

Related U.S. Application Data

(60) Provisional application No. 62/130,893, filed on Mar. 10, 2015.

(51) Int. Cl.
*H04W 76/02* (2009.01)
*H04W 8/00* (2009.01)
*H04W 40/00* (2009.01)
*H04W 72/04* (2009.01)
*H04B 7/155* (2006.01)
*H04W 88/04* (2009.01)

(52) U.S. Cl.
CPC ...... *H04W 76/023* (2013.01); *H04B 7/15557* (2013.01); *H04W 8/005* (2013.01); *H04W 40/00* (2013.01); *H04W 72/048* (2013.01); *H04W 88/04* (2013.01)

(58) Field of Classification Search
CPC .. H04B 1/59; H04B 7/026; H04B 7/14; H04L 9/3247; H04L 9/3066; H04L 69/322; H04L 61/6013; H04L 51/00; H04L 61/2503; H04L 51/18; H04W 4/005; H04W 4/08; H04W 88/04
See application file for complete search history.

(56) References Cited

U.S. PATENT DOCUMENTS

2009/0216887 A1* 8/2009 Hertle ................. H04L 29/125
709/227
2013/0324114 A1* 12/2013 Raghothaman ..... H04W 76/023
455/426.1
2015/0009908 A1* 1/2015 Kalapatapu ......... H04L 12/6418
370/329

(Continued)

OTHER PUBLICATIONS

3GPP TR 23.713, "3rd Generation Partnership Project; Technical Specification Group Services and System Aspects; Study on extended architecture support for Proximity-based services", (Release 13) V0.4.0, Feb. 2015, 59 pages.

(Continued)

*Primary Examiner* — Benjamin H Elliott, IV
(74) *Attorney, Agent, or Firm* — Stoel Rives LLP

(57) ABSTRACT

A user equipment (UE) is configured to receive a request from a first peer UE to communicate with a target user corresponding to a second peer UE. The UE is configured to determine that the second peer UE is within a communication range of the UE. The UE is configured to, in response to receiving the request, relay internet protocol (IP) packets from the first peer UE to the second peer UE and relay IP packets from the second peer UE to the first peer UE.

13 Claims, 5 Drawing Sheets

(56) References Cited

U.S. PATENT DOCUMENTS

| | | | |
|---|---|---|---|
| 2015/0029866 A1* | 1/2015 | Liao | H04W 4/008 370/241 |
| 2015/0085740 A1* | 3/2015 | Kalapatapu | H04W 88/04 370/315 |
| 2016/0198516 A1* | 7/2016 | Kim | H04L 12/189 370/312 |
| 2016/0212780 A1* | 7/2016 | Stojanovski | H04W 8/005 |
| 2016/0270134 A1* | 9/2016 | Stojanovski | H04W 8/005 |

OTHER PUBLICATIONS

Catt, "Consideration About the Communication via the ProSe UE-UE Relay", S2-143881, SA WG2 Meeting #106, San Francisco, CA, US, Agenda Item 7.13, Nov. 17-21, 2014, 5 pages.

Catt, "Considerations About ProSe UE-UE Relays", S2-142853, SA WG Meeting #104, Dublin, Ireland, Agenda Item 7.13, Jul. 7-11, 2014, 3 pages.

PCT/US2016/013195, International Search Report and Written Opinion, dated Mar. 31, 2016, 15 pages.

Renesas Mobile Europe Ltd., "Connection setup via ProSe UE-to-UE Relay", S2-131972, SA WG2 Meeting #97, Busan, South Korea, Agenda Item 6.4, May 27-31, 2013, 3 pages.

\* cited by examiner

SYSTEMS, METHODS, AND DEVICES FOR DEVICE-TO-DEVICE RELAY COMMUNICATION

RELATED APPLICATION

This application claims the benefit under 35 U.S.C. § 119(e) of U.S. Provisional Application No. 62/130,893, filed Mar. 10, 2015, which is hereby incorporated by reference herein in its entirety.

TECHNICAL FIELD

The present disclosure relates to device-to-device communication and more particularly relates to device-to-device relay communication.

DETAILED DESCRIPTION OF PREFERRED EMBODIMENTS

Figure 1:
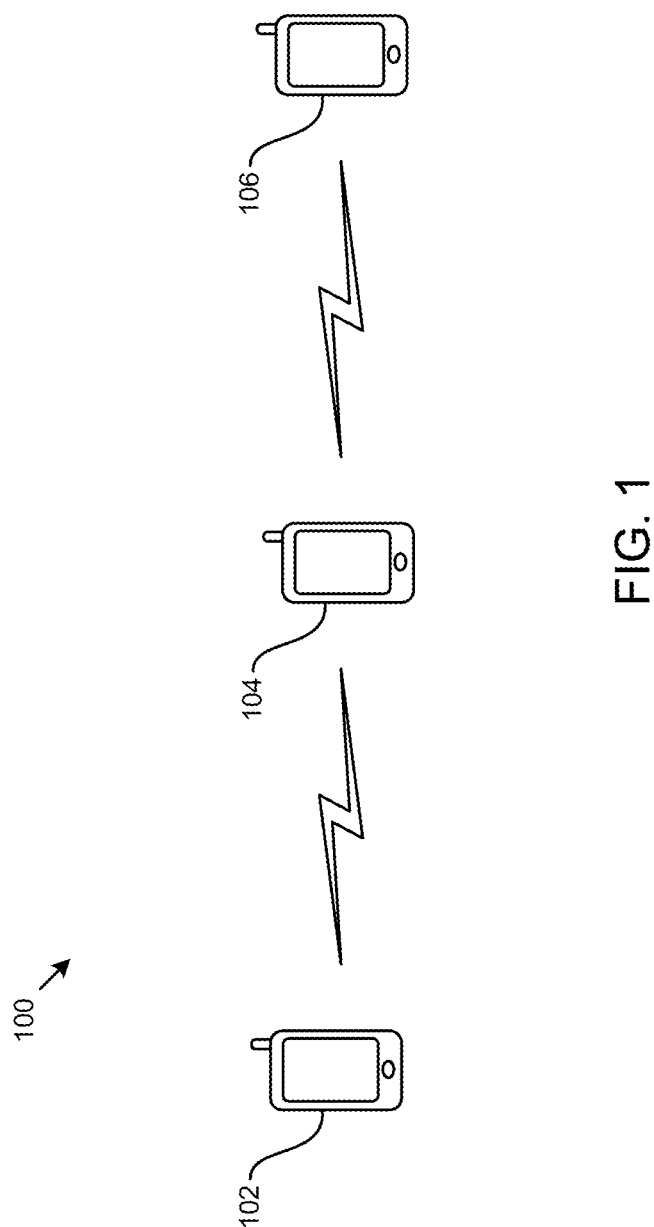
FIG. 1 is a schematic diagram illustrating a system for user equipment (UE) to UE communications consistent with embodiments disclosed herein.

A detailed description of systems and methods consistent with embodiments of the present disclosure is provided below. While several embodiments are described, it should be understood that disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as WiMAX (Worldwide Interoperability for Microwave Access); and the IEEE 802.11 standard, which is commonly known to industry groups as WiFi. In 3GPP radio access networks (RANs) in LTE systems, the base station can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs) in an E-UTRAN, which communicates with the wireless mobile device, known as user equipment (UE). A downlink (DL) transmission can be a communication from the base station (or eNB) to the wireless mobile device (or UE), and an uplink (UL) transmission can be a communication from the wireless mobile device to the base station.

Proximity-based applications and proximity services (ProSe) represent an emerging social-technological trend. Proximity-based communication (which is also referred to herein as device-to-device (D2D) communication, direct communication, one-to-one communication, or peer-to-peer (P2P) communication) is a powerful technique for increasing network throughput by enabling direct communications between mobile stations rather than using network infrastructure, and has a wide variety of applications. For example, D2D has been proposed for local social networks, content sharing, location-based marketing, service advertisements, public safety networks, mobile-to-mobile applications, and other services. D2D communications are of interest due to their ability to reduce load on a core network or a RAN, increase data rates due to direct and short communication paths, provide public safety communication paths, and provide other functionality. The introduction of a ProSe capability in LTE would allow the 3GPP industry to serve this developing market, and, at the same time, serve the urgent needs of several public safety services. This combined use may enable economy of scale advantages because the resulting system may be used for both public safety and non-public-safety services, where possible.

There are various alternatives to realize such a direct communication path between mobile devices. In one embodiment, the D2D air interface PC5 (i.e., interface for D2D communication) could be realized by some type of short-range technology, such as Bluetooth or Wi-Fi, or by reusing a licensed LTE spectrum, such as a UL spectrum in a frequency division duplex (FDD) system and UL subframes in a time division duplex (TDD) system.

FIG. 1 illustrates a system 100 for UE-UE relay communications. The system 100 includes a first UE 102, a second UE 104, and a third UE 106. The first UE 102 and third UE 106 are both within range of the second UE 104. However, the first UE 102 and third UE 106 are outside of a communication range. In one embodiment, the second UE 104 may operate as a relay-to-relay communications between the first and third UEs 102, 106. For example, this may enable D2D services even if two specific devices are not within range of each other. D2D relay communications may be useful in a variety of settings such as for communication in public safety networks, or in out-of-coverage or network overload scenarios.

According to a 3GPP Release 13 (Rel-13) study on ProSe enhancements there are three types of public safety discovery (see 3GPP technical report (TR) 23.713). The first is UE-to-network relay discovery, the second is group member discovery, and the third is and UE-to-UE relay discovery. All three types of discovery can be performed as either Model A (announce/monitor) or Model B (discoverer/discoveree). The Model A procedure includes a single message (announcement) that is periodically broadcasted by the announcing UE. The Model B procedure is performed with two messages: a solicitation message (typically broadcasted or groupcasted) and a response message (typically unicasted).

Figure 2:
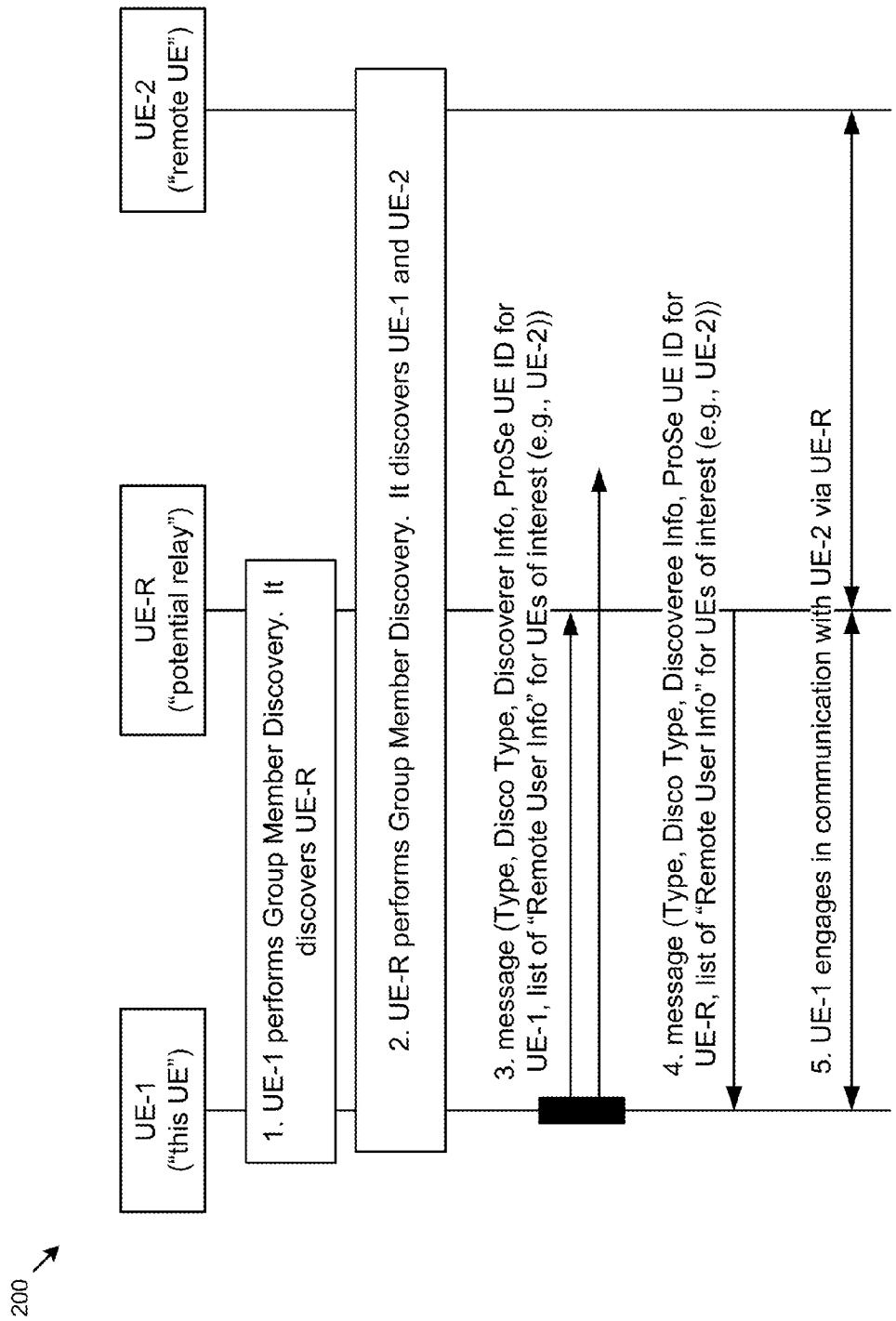
FIG. 2 is a schematic block diagram illustrating a call flow for UE-to-UE discovery.

FIG. 2 is a schematic call flow diagram 200 illustrating an example of a Model B procedure for UE-to-UE Relay discovery. The call flow diagram of FIG. 2 is from FIG. 6.1.2.4.2.1 found in clause 6.1.2.4.2 of 3GPP TR 23.716, version 0.4.0 dated February 2015. The following description of FIG. 2 is from 3GPP TR 23.716 clause 6.1.2.4.2;

1. UE-1 ("this UE") performs the Group Member Discovery procedure described FIG. 6.1.2.3.1.1 (Model A)

or FIG. 6.1.2.3.2.1 (Model B). In the process UE-1 discovers UE-R as its only neighbour.

2. UE-R ("the potential relay") also performs the Group Member Discovery procedure described in FIG. 6.1.2.3.1.1 (Model A) or FIG. 6.1.2.3.2.1 (Model B). In the process UE-R discovers two UEs in vicinity: UE-1 and UE-2.

NOTE: The execution of the Group Member Discovery procedure in steps 1 and 2 is a pre-requisite for the execution of the UE-to-UE Relay discovery procedure proper that only starts at step 3.

3. Having discovered its neighbours, UE-1 realises that the group member of interest ("remote user") is not within direct range. UE-1 then (in the role of Discoverer) solicits potential UE-to-UE Relays by transmitting the Solicitation message including the following parameters:
Type=Solicitation
Discovery Type=UE-to-UE Relay Discovery
Discoverer Info (i.e. an upper layer identifier for the UE-1 user)
ProSe UE ID of UE-1 (i.e. link-layer identifier of UE-1)
A list of "Remote User Info" parameters corresponding to the remote user(s) of interest (in this case it is the user of UE-2). "Remote User Info" is an upper layer parameter identifying the "remote user" of interest.

4. Upon reception of the Solicitation message, UE-R (in the role of Discoveree) realises that it can act as a UE-to-UE Relay and replies with a Response message including the following parameters:
Type=Response
Discovery Type=UE-to-UE Relay Discovery
Discoveree Info (i.e. an upper layer identifier for the UE-R user)
ProSe UE ID of UE-R (i.e. link-layer identifier of UE-R)
A list of "Remote User Info" parameters corresponding to the remote user(s) of interest (in this case it is the user of UE-2). The latter have been gathered during Group Member Discovery in step 2.

5. Based on the information received in the previous step, UE-1 decides to establish a one-to-one link with UE-R as described in clause 7.1 and engage in communication with UE-2 via UE-R (case of stateful relay selection).

The present disclosure proposes systems, devices, and methods which may be used to enable D2D relay communications. Specifically, the systems, devices, and methods may enable communication via UE-UE relay using layer-3 relaying. In one embodiment, the UE-UE relay has no RAN impact. For example, the systems, devices, and methods disclosed herein may be used as 3GPP standards enhancements for D2D communication via a UE-UE relay for public safety use. Although many examples and embodiments are presented in relation to 3GPP standards, the present disclosure may also apply to other communication standards or environments, without limitation. In one embodiment, the present disclosure provides devices, systems, and methods for implementing or performing functions or procedures to realize item 5 of FIG. 2. For example, the present disclosure provides systems, methods and devices teaching how the two UEs (UE-1 and UE-2) can effectively engage in communication via the relay UE (UE-R) once UE-1 has discovered that a UE of interest (UE-2) is available via a relay UE (UE-R).

According to one embodiment, a method for UE-UE relay communication includes a source UE (e.g., UE-1 of FIG. 2 or the first UE 102 of FIG. 1) discovering a remote UE of interest (e.g., UE-2 of FIG. 2 or the third UE 106 of FIG. 1) that is reachable via a potential relay UE (eg., UE-R of FIG. 2 or the second UE 104 of FIG. 1). The method includes the source UE requesting establishment of a one-to-one communication link with the potential relay UE including an indication that the link is being requested specifically for the purpose of relaying towards the remote UE. Based on the received request, the potential relay UE requests establishment of a one-to-one communication link with the remote UE including an indication that the link is being requested specifically for relaying from the source relay. Once the two links are established (e.g., from the source UE to the relay UE and from the relay UE to the remote UE), the source UE and the remote UE use a service discovery protocol (e.g., Bonjour) to learn their internet protocol (IP) addresses. Alternatively, if their IP addresses have been assigned by UE-R, UE-R may send signals indicating the IP addresses of each of the remote and source UEs to both.

According to one embodiment, a UE is configured to: receive a request from a first peer UE to communicate with a target user corresponding to the second peer UE; determine that the second peer UE is within a communication range of the UE; and in response to receiving the request, relay IP packets from the first peer UE to the second peer UE and relay IP packets from the second peer UE to the first peer UE.

According to one embodiment, a baseband processor includes: logic configured to determine that a relay peer communication device is available for communication with a remote peer communication device; logic configured to prepare a message to the relay peer communication device, the message to the relay peer communication device including a request to communicate with the remote communication device, wherein the remote communication device is outside a communication range of a device corresponding to the baseband processor and wherein the remote communication device is within a communication range of the relay peer communication device; and logic configured to format a packet for transmission to the remote communication device via the relay peer communication device.

According to one embodiment, a UE includes a decode component, a request component, an IP address component, and a communication component. The decode component is configured to process a message from a proximate UE comprising a direct communication request to communicate with a remote UE. The request component is configured to transmit a message to the proximate UE indicating acceptance of the direct communication request to communicate with the remote UE. The IP address component is configured to determine an internet protocol (IP) address assigned to the UE by the proximate UE. The communication component is configured to communicate with the remote UE via the proximate UE.

Example communication via a UE-to-UE relay and set-up using Layer-3 relaying will be discussed further below.

Figure 3:
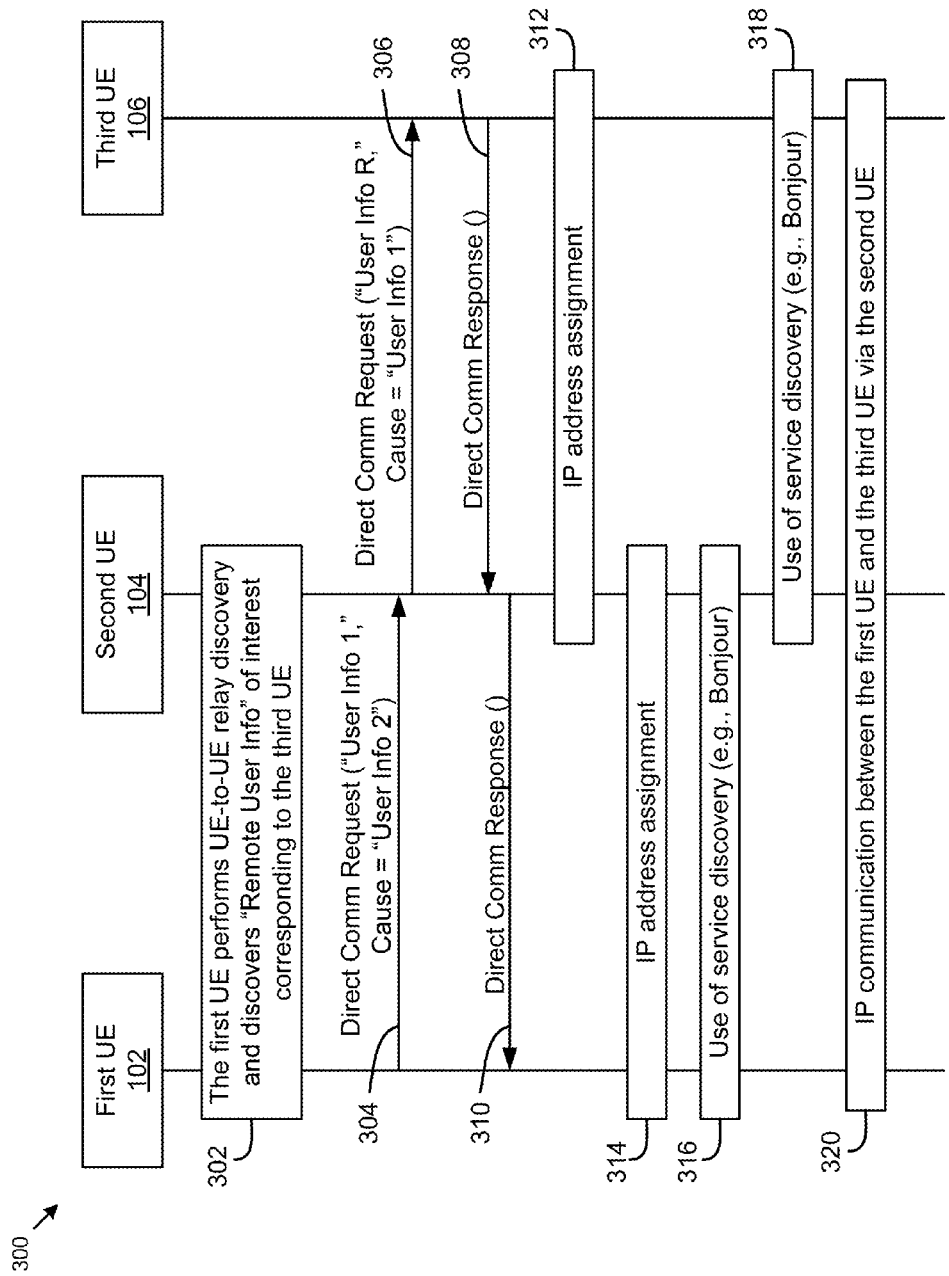
FIG. 3 is a schematic block diagram illustrating an example call flow for UE-to-UE relaying consistent with embodiments disclosed herein.

To support Layer-3 relaying in the UE-to-UE relay, UEs that are remote from each other and want to communicate with each other may first need to establish a link for one-to-one ProSe direct communication with a relay UE and learn each other's IP addresses. FIG. 3 is a diagram of a call flow 300 illustrating stateful UE-to-UE relaying with layer-3 forwarding between a first UE 102, a second UE 104, and a third UE 106. Specifically, the call flow 300 illustrates one embodiment of establishing direct communication and obtaining IP addressing.

In the call flow 300, the first UE 102 performs, at 302, UE-to-UE relay discovery. For example, the first UE 102 may perform UE-to-UE relay discovery as described in 3GPP TR 23.713 clause 6.1.2.4. As a result of performing discovery, the first UE 102 may discover that "Remote User Info" corresponding to a user of interest (e.g., corresponding to the third UE 106) is reachable via the second UE 104. Assuming that the first UE 102 does not have an already established link with the second UE 104, the first UE 102 triggers establishment of a link for one-to-one ProSe direct communication with the second UE 104 at 304 by sending a direct communication request message. The direct communication request message may include information corresponding to a first user ("User Info 1") and a cause value or parameter (Cause="User Info 2"). In one embodiment, the "User Info 1" is an upper layer identity of a user of the first UE 102. The cause parameter indicates that this one-to-one link is being requested for the specific purpose of relaying towards a UE owned by the user identified via "User Info 2." For example, the "User Info 2" may be an upper layer identity of a user for the third UE 106. In one embodiment, user information included within messages may or may not include identifiers that are subject to the 3GPP specification. For example, the user information may include email addresses, usernames, or any other information that can be used to identify a user. In one embodiment, the user information could be defined in a user@realm format, similar to email messages.

Based on the direct communication request received from the first UE 102 at 304, the second UE 104 triggers establishment of a link for one-to-one ProSe direct communication with the third UE 106 at 306 by sending a direct communication request to the third UE 106. The direct communication request message at 306 may include information corresponding to a third user ("User Info R") and a cause value or parameter (Cause="User Info 1"). In one embodiment, the "User Info R" is an upper layer identity of a user of the second UE 104. The cause parameter indicates that this one-to-one link is being requested for the specific purpose of relaying from the first UE 102 owned by the user identified via "User Info 1."

At 308, the third UE 106 accepts the establishment of a direct link with UE-R by sending a direct communication response message. At 310, the second UE 104 accepts the establishment of a direct link with the first UE 102 by sending a direct communication response message.

At 312 and 314, the first UE 102 and second UE 104 are assigned IP addresses. The IP addresses may be assigned in various ways. In one embodiment, for IP version 4 (IPv4) or IP version 6 (IPv6) addresses, the first UE 102 and the third UE 106 may be assigned IP addresses by using dynamic host configuration protocol (DHCP) version 4. For example, the second UE 104 may operate as a DHCP server to assign IP addresses to the first UE 102 and/or the third UE 106. In another embodiment, the first UE 102 and the third UE 106 may be assigned IP addresses for IPv4 by using dynamically configured link-local addresses as defined by Request for Comments: 3927 (RFC 3927). In one embodiment, the first UE 102 and the third UE 106 may be assigned IP addresses for IPv6 using stateless address autoconfiguration (SLAAC). For example, the second UE 104 may act as a default router and assign IPv6 addresses to the first UE 102 and the third UE 106.

At 316 and 318, after IP address assignment is complete at 312 and 314, the first UE 102 and the third UE 106 perform service discovery (e.g., using Bonjour or multicast domain name services (DNS) defined in RFC 6762) to discover each other's IP address. At 320, having learned each other's IP address, the first UE 102 and the third UE 106 may engage in IP-based communication.

In one embodiment, it is possible that either of the two remote UEs (the first UE 102 or the third UE 106) has already an established link with the second UE 104 when the first UE 102 decides to reach the third UE 106 via the second UE 104. In that case, according to one embodiment, the procedure described in FIG. 3 may be modified so that different signalling messages are used at 304, 306, 308, and 310. For example, direct communication update requests containing the user info and cause values may be used at 304 and 306 instead of the illustrated direct communication requests. Similarly, direct communication update response messages may be used instead of the direct communication responses at 308 and 310. In one embodiment, update requests and update responses may be used by/for one UE and not the other. For example, if the first UE 102 already has a direct communication link with the second UE 104 and the third UE 106 does not, the first UE 102 may send a direct communication update request at 304 and receive a direct communication update response at 310, while the third UE 106 receives a direct communication request at 306 and sends a direct communication update response at 308.

According to one embodiment, the call flow 300 of FIG. 3 may be modified to provide the IP addresses in a different manner, such as in the requests or responses (e.g., a direct communication request, a direct communication update request, a direct communication response, and/or a direct communication update response). For example, with IPv4 addressing, the second UE 104 may act as a centralized IP address assignor and use PC5 signalling protocol messages to convey the IP addresses (instead of DHCP). In one embodiment, upon reception of the first UE 102's request at 304, the second UE 104 assigns an IP address for each of the two remote UEs (the first UE 10'2 and the third UE 106) and provides one or both IP addresses to the third UE 106 at 306 and provides one or both IP addresses to the first UE at 310. Inclusion of the IP addresses in a request and/or response may reduce the number of communications in a call flow. For example, if only the IP address assigned to a specific remote UE is provided in the request or response, separate IP address assignment at 312 and 314 may not be needed. As another example, if both an address assigned to a UE and an address assigned to a remote UE are provided to the respective UEs, a need for separate IP address assignment at 312 and 314 as well as IP address discovery at 316 and 318 may be eliminated. For example, one embodiment of a call flow for stateful UE-to-UE relaying may include the messaging at 304, 306, 308, 310, and 320 without including the messaging/interaction at 312, 314, 316, and 318. However, depending on the embodiment, tradeoffs between increased payload in the request or update messages (e.g., to include the IP addresses) and reduced numbering of messages or interactions must be considered.

In one embodiment, a relay or potential relay UE is configured to receive a request from a requesting UE indicating that it wishes to engage in communication with a remote UE (or user corresponding to a remote UE). For example, the requesting UE may indicate that it wishes to engage with the remote user by including a cause value that includes user information identifying the remote user. The relay or potential relay UE may check to see if a remote UE corresponding to the user is available to determine whether the relay or potential relay UE is able to act as a relay. For example, the potential relay UE may check a list of UEs that are a result of UE-to-UE relay discovery or group member discovery to see if remote UE is available. If the remote UE is available, the relay or potential relay UE may then decide to act as UE-to-UE relay for the requesting UE and the remote UE. For example, if the remote UE is within a communication range of the potential relay UE, then the potential relay UE may decide to act as a relay between the remote UE and the requesting UE. In one embodiment, once the potential relay UE decides to act as a relay, the potential relay UE performs relaying of IP packets between the requesting UE and the remote UE.

In one embodiment, the request from the requesting UE is included in a request for link establishment or link update with the potential relay UE. In one embodiment, the request for link establishment or link update contains an indication that it will be used to engage in communication with a target remote user (this target remote user happens to be the owner/user of the remote UE). In one embodiment, the potential relay UE, based on the received request from the requesting UE, identifies the remote UE as being owned or used by the target remote user. In one embodiment, the requesting UE sends a link establishment request or update request to the remote UE. In one embodiment, the link establishment request or link update request includes an indication that a source remote user (that happens to be the owner/user of the requesting UE) wishes to engage in communication with the remote UE. In one embodiment, the potential relay UE acts as a DHCP server or default IP router (i.e., as IP address assignor) for the requesting UE and the remote UE. In one embodiment, the assigned IP addresses are conveyed to the requesting UE and the remote UE inside messages for link establishment (e.g., inside a direct communication request, direct communication response, direct communication update request and/or direct communication update response).

Figure 4:
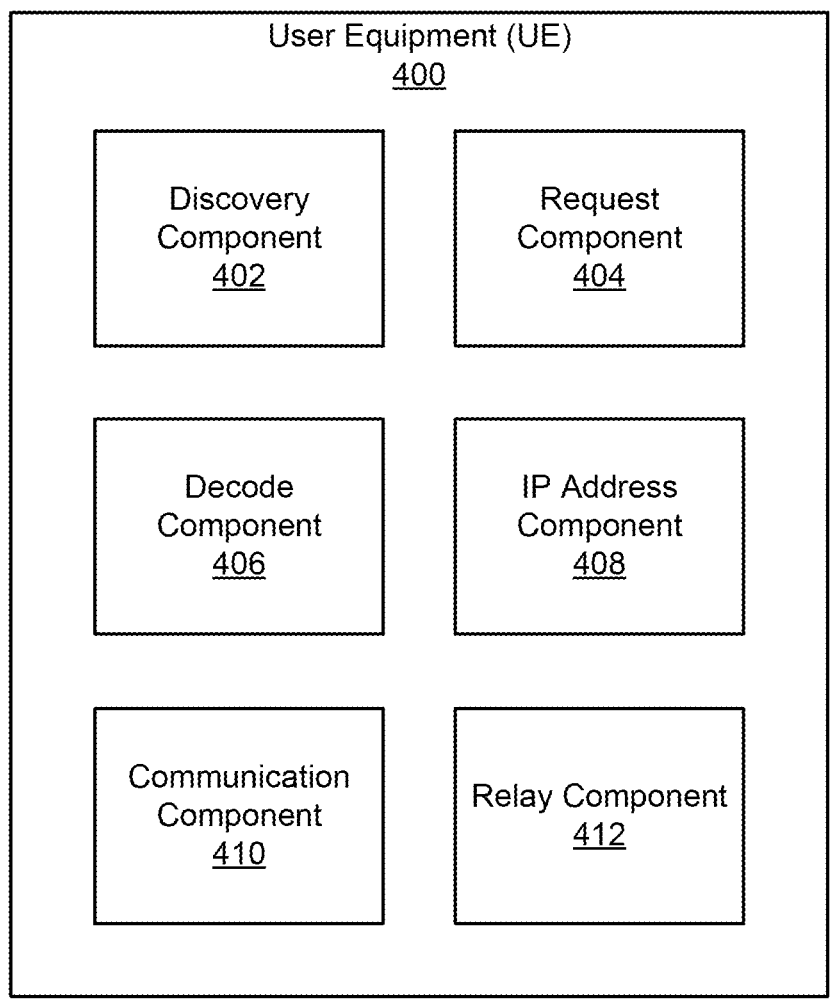
FIG. 4 is a schematic block diagram illustrating components of a UE consistent with embodiments disclosed herein.

Turning to FIG. 4, a schematic block diagram of one embodiment of a UE 400 is shown. The UE 400 may be capable of performing the functions for any of the UEs disclosed herein. For example, the UE 400 may be capable of operating as a requesting UE (such as the first UE 102), as a potential relay UE (such as the second UE 104), and/or as a remote UE (such as the third UE 106). The UE 400 includes a discovery component 402, a request component 404, a decode component 406, an IP address component 408, a communication component 410, and a relay component 412. In one embodiment, one or more of the components 402-412 are part of a processor, such as a baseband processor of the UE 400. For example, a baseband processor may be sold or manufactured separately and included as part of the UE 400, such as a mobile phone, a tablet, or an MTC device. The UE 400 or processor may include logic, circuitry, code, or the like that implements each of the components 402-412.

The discovery component 402 is configured to discover one or more UEs within a communication region of the UE 400. For example, the discovery component 402 may detect and/or respond to signals announcing or requesting announcement of the identity or presence of other UEs. In one embodiment, the discovery component obtains UE or user identity information for UEs that are within range of the UE 400. For example, the discovery component 402 may perform a group member discovery procedure to discover a first peer UE and a second peer UE and to discover user information corresponding to each of the first peer UE and the second peer UE.

In addition to discovering specific UEs or user information of UEs that are within range of the UE 400, the discovery component 402 may also discover that UEs or user information of UEs are remote from the UE 400. In one embodiment, such as when the UE is acting as a requesting UE (such as the first UE 102 in FIG. 3), the discovery component 402 is configured to determine that a relay peer communication device is available for communication with a remote peer communication device. For example, the remote peer communication device may be outside a direct communication range but is within direct communication range of the relay peer communication device. Once again, user information of the remote device may also be discovered. Thus, the discovery component 402 may be able to discover not only devices or users that are in range of the UE 400 but also devices or users that are in range of other UEs. In one embodiment, the discovery component 402 is configured to determine whether the UE 400 is within network coverage, outside of network coverage, and/or within partial network coverage.

The request component 404 is configured to send a message requesting establishment or updating of a communication session or link. For example, while operating as a requesting UE (e.g., the first UE 102 of FIG. 3), the request component 404 of the UE 400 may prepare a message to a relay peer communication device. The message to the relay peer communication device may include a request to communicate with a remote communication device that is outside a communication range of the UE 400 but is within a communication range of the relay peer communication device. As another example, while operating as a relay UE or potential relay UE (such as the second UE 104 of FIG. 3), the UE 400 may send a link establishment request or link update request to another peer UE in response to determining that the other peer UE corresponds to a target user. For example, the UE 400 may send the link establishment request or link update request after a requesting UE indicates that it wishes to communicate with the other peer UE. When operating as a remote UE (such as the third UE 106 of FIG. 3), the request component 404 of the UE may prepare and/or transmit a message to a relay or potential relay UE indicating acceptance of a direct communication request to communicate with the requesting UE. The request component 404 may send request or accept messages that include a direct communication request, a direct communication update request, a direct communication response, or a direct communication update response.

The decode component 406 is configured to decode or interpret messages received by the UE 400. When the UE 400 is operating as a relay or a potential relay (such as the second UE 104 of FIG. 3), the decode component 406 may receive and/or decode a request from a peer UE to communicate with a target user corresponding to the other peer UE. In one embodiment, the request from the peer UE includes a request for link establishment or link update with the UE 400. In one embodiment, the request for link establishment or link update from the peer UE includes an indication that the request is for communication with a target user corresponding to the other UE.

When the UE 400 is operating as a requesting UE (such as the first UE 102 of FIG. 3), the decode component 406 may decode a response from the relay UE that indicates that the relay UE accepts the request to communicate with the remote device. In one embodiment, UE 400 is configured to format an IP packet for transmission to the remote communication device via the relay UE and/or is configured to format the IP packet in response to decoding the response. In one embodiment, the decode component 406 is configured to decode or process one or more messages indicating an IP address for a remote communication device corresponding to a target user and an IP address for the UE 400.

When the UE 400 is operating as a remote UE (such as the third UE 106 of FIG. 3), the decode component 406 may process a message from a proximate UE comprising a direct communication request to communicate with a requesting UE. In one embodiment, the message from the proximate UE includes an indication that the request is for communication with a source user corresponding to the requesting UE. In one embodiment, the message from the proximate UE includes a link establishment request or update, and the UE 400 responds by providing a link establishment response or link update response. In one embodiment, the decode component 406 decodes a message from the proximate UE that includes an IP version 4 address for the UE 400 assigned by the proximate UE and an IP version 4 address for the requesting UE.

The IP address component 408 is configured to determine an IP address for the UE 400 and/or for one or more other UEs. In one embodiment, the IP address component configured to determine an internet protocol (IP) address assigned to the UE by the proximate UE. For example, when the UE 400 is operating as a relay or potential relay, the IP address component 408 is configured to act as one or more of a dynamic host configuration protocol (DHCP) server and a default IP router for communication between the first proximate UE and the second peer UE. In one embodiment, the IP address component 408 is configured to send assigned IP version 4 addresses to the first peer UE and the second peer UE. In one embodiment, the IP address component 408 sends an IP address for a requesting UE to a remote UE in a link establishment request or link update request. In one embodiment, the IP address component 408 sends an IP address for the remote UE to a requesting UE in a link establishment response or link update response.

In one embodiment, the IP address component 408 is configured to perform service discovery to discover an IP address of one or more other UEs. For example, when the UE 400 is operating as a requesting UE (such as the first UE 102 of FIG. 3) the IP address component 408 may discover an IP address of a remote UE (such as the third UE 106 of FIG. 3). In one embodiment, after the IP address component 408 obtains an IP address of the remote UE, the UE 400 may prepare or format an IP packet for transmission to the remote UE via a relay UE.

When the UE 400 is operating as a remote or target UE (such as the third UE 106 of FIG. 3), the IP address component 408 may perform service discovery to determine an IP address for the remote UE. For example, the IP address component 408 may use a service discovery procedure or standard, such as Bonjour, to discover an IP address of another UE. In one embodiment, the IP address component 408 may determine the IP address assigned to the UE 400 or another UE based on a message from the relay or potential UE.

The communication component 410 is configured to communicate with other UEs by sending and receiving signals. For example, the communication component 410 may control operation of a radio to receive or send messages or other signals. In one embodiment, the communication component 410 is configured to format packet s for transmission to a remote UE via a relay UE. For example, the communication component 410 may send a message to or receive a message from another UE via the relay UE.

The relay component 412 is configured to cause the UE 400 to operate as a relay or potential relay. For example, the relay component 412 may determine whether the UE 400 should operate as a relay in response to receiving a request to communicate with a UE that is within a communication range of the UE. For example, if the UE 400 receives a request with a cause value identifying a user of a different UE, the relay component 412 may determine whether the different UE is within range of the UE 400. If the relay component 412 determines that the UE corresponds to a user indicated in a cause value, the relay component 412 may, in response to receiving the request, relay IP packets between UEs that are out of range with each other but are within range of the UE 400.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 5:
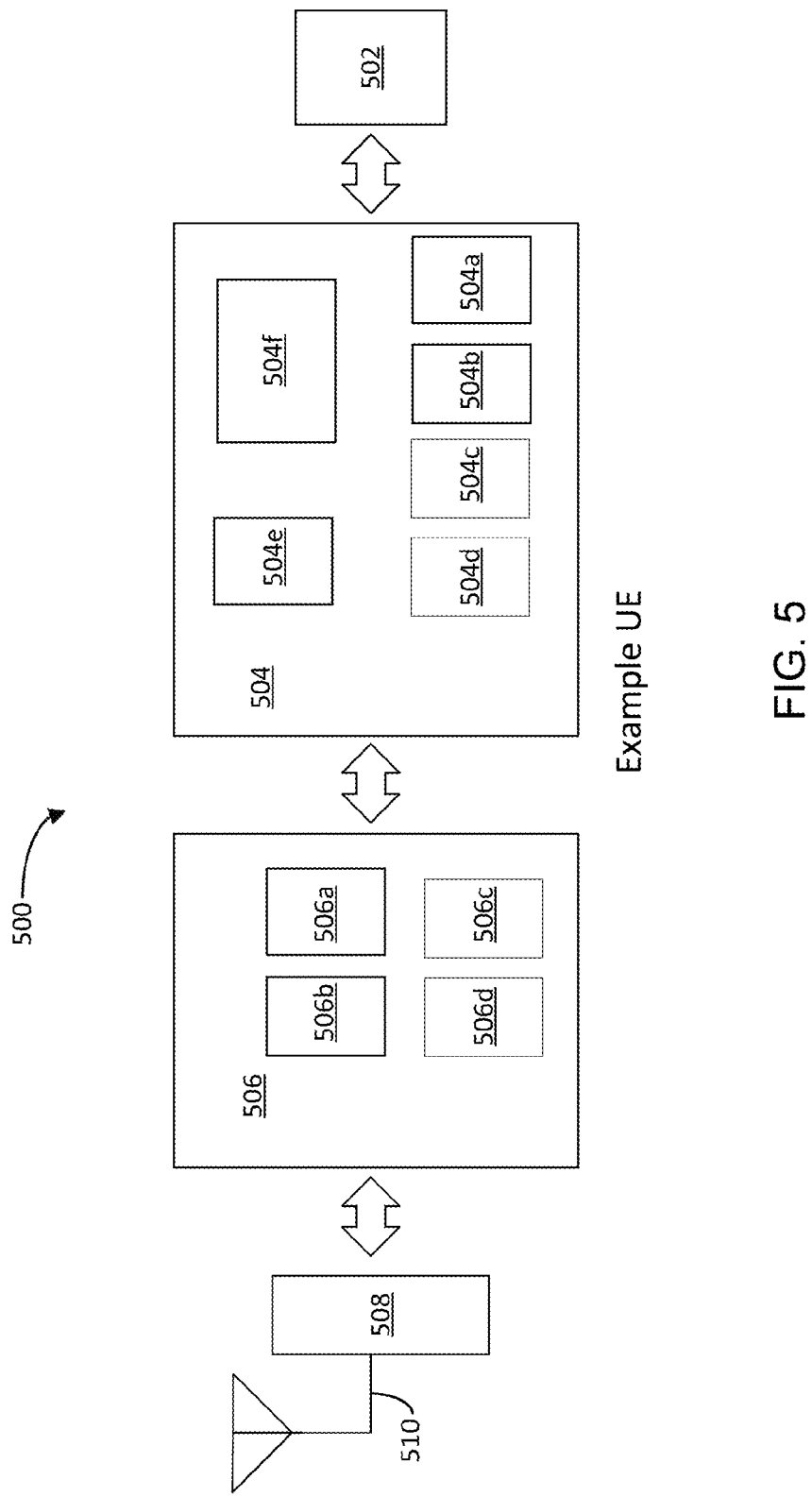
FIG. 5 is a schematic diagram of a mobile device consistent with embodiments disclosed herein.

Embodiments described herein may be implemented into a system using any suitably configured hardware and/or software. FIG. 5 illustrates, for one embodiment, example components of a UE device 500. In some embodiments, the UE device 500 may include application circuitry 502, baseband circuitry 504, Radio Frequency (RF) circuitry 506, front-end module (FEM) circuitry 508 and one or more antennas 510, coupled together at least as shown.

The application circuitry 502 may include one or more application processors. For example, the application circuitry 502 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 504 may include circuitry such as, but not limited to, one or more single-core or multi-core processors. The baseband circuitry 504 may include one or more baseband processors and/or control logic to process baseband signals received from a receive signal path of the RF circuitry 506 and to generate baseband signals for a transmit signal path of the RF circuitry 506. Baseband processing circuitry 504 may interface with the application circuitry 502 for generation and processing of the baseband signals and for controlling operations of the RF circuitry 506. For example, in some embodiments, the baseband circuitry 504 may include a second generation (2G) baseband processor 504*a*, third generation (3G) baseband processor 504*b*, fourth generation (4G) baseband processor 504*c*, and/or other baseband processor(s) 504*d* for other existing generations, generations in development or to be developed in the future (e.g., fifth generation (5G), 6G, etc.). The baseband circuitry 504 (e.g., one or more of baseband processors 504*a-d*) may handle various radio control functions that enable communication with one or more radio networks via the RF circuitry 506. The radio control functions may include, but are not limited to, signal modulation/demodulation, encoding/decoding, radio frequency shifting, etc. In some embodiments, modulation/demodulation circuitry of the baseband circuitry 504 may include Fast- Fourier Transform (FFT), precoding, and/or constellation mapping/demapping functionality. In some embodiments, encoding/decoding circuitry of the baseband circuitry 504 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 504 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 504e of the baseband circuitry 504 may be configured to run elements of the protocol stack for signaling of the PHY, MAC, RLC, PDCP and/or RRC layers. In some embodiments, the baseband circuitry may include one or more audio digital signal processor(s) (DSP) 504f. The audio DSP(s) 504f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 504 and the application circuitry 502 may be implemented together such as, for example, on a system on a chip (SOC).

In some embodiments, the baseband circuitry 504 may provide for communication compatible with one or more radio technologies. For example, in some embodiments, the baseband circuitry 504 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 504 is configured to support radio communications of more than one wireless protocol may be referred to as multi-mode baseband circuitry.

RF circuitry 506 may enable communication with wireless networks using modulated electromagnetic radiation through a non-solid medium. In various embodiments, the RF circuitry 506 may include switches, filters, amplifiers, etc. to facilitate the communication with the wireless network. RF circuitry 506 may include a receive signal path which may include circuitry to down-convert RF signals received from the FEM circuitry 508 and provide baseband signals to the baseband circuitry 504. RF circuitry 506 may also include a transmit signal path which may include circuitry to up-convert baseband signals provided by the baseband circuitry 504 and provide RF output signals to the FEM circuitry 508 for transmission.

In some embodiments, the RF circuitry 506 may include a receive signal path and a transmit signal path. The receive signal path of the RF circuitry 506 may include mixer circuitry 506a, amplifier circuitry 506b and filter circuitry 506c. The transmit signal path of the RF circuitry 506 may include filter circuitry 506c and mixer circuitry 506a. RF circuitry 506 may also include synthesizer circuitry 506d for synthesizing a frequency for use by the mixer circuitry 506a of the receive signal path and the transmit signal path. In some embodiments, the mixer circuitry 506a of the receive signal path may be configured to down-convert RF signals received from the FEM circuitry 508 based on the synthesized frequency provided by synthesizer circuitry 506d. The amplifier circuitry 506b may be configured to amplify the down-converted signals and the filter circuitry 506c may be a low-pass filter (LPF) or band-pass filter (BPF) configured to remove unwanted signals from the down-converted signals to generate output baseband signals. Output baseband signals may be provided to the baseband circuitry 504 for further processing. In some embodiments, the output baseband signals may be zero-frequency baseband signals, although this is not a requirement. In some embodiments, mixer circuitry 506a of the receive signal path may comprise passive mixers, although the scope of the embodiments is not limited in this respect.

In some embodiments, the mixer circuitry 506a of the transmit signal path may be configured to up-convert input baseband signals based on the synthesized frequency provided by the synthesizer circuitry 506d to generate RF output signals for the FEM circuitry 508. The baseband signals may be provided by the baseband circuitry 504 and may be filtered by filter circuitry 506c. The filter circuitry 506c may include a low-pass filter (LPF), although the scope of the embodiments is not limited in this respect.

In some embodiments, the mixer circuitry 506a of the receive signal path and the mixer circuitry 506a of the transmit signal path may include two or more mixers and may be arranged for quadrature downconversion and/or upconversion respectively. In some embodiments, the mixer circuitry 506a of the receive signal path and the mixer circuitry 506a of the transmit signal path may include two or more mixers and may be arranged for image rejection (e.g., Hartley image rejection). In some embodiments, the mixer circuitry 506a of the receive signal path and the mixer circuitry 506a may be arranged for direct downconversion and/or direct upconversion, respectively. In some embodiments, the mixer circuitry 506a of the receive signal path and the mixer circuitry 506a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 506 may include analog-to-digital converter (ADC) and digital-to-analog converter (DAC) circuitry and the baseband circuitry 504 may include a digital baseband interface to communicate with the RF circuitry 506.

In some dual-mode embodiments, a separate radio IC circuitry may be provided for processing signals for each spectrum, although the scope of the embodiments is not limited in this respect.

In some embodiments, the synthesizer circuitry 506d may be a fractional-N synthesizer or a fractional N/N+1 synthesizer, although the scope of the embodiments is not limited in this respect as other types of frequency synthesizers may be suitable. For example, synthesizer circuitry 506d may be a delta-sigma synthesizer, a frequency multiplier, or a synthesizer comprising a phase-locked loop with a frequency divider.

The synthesizer circuitry 506d may be configured to synthesize an output frequency for use by the mixer circuitry 506a of the RF circuitry 506 based on a frequency input and a divider control input. In some embodiments, the synthesizer circuitry 506d may be a fractional N/N+1 synthesizer.

In some embodiments, frequency input may be provided by a voltage controlled oscillator (VCO), although that is not a requirement. Divider control input may be provided by either the baseband circuitry 504 or the applications processor 502 depending on the desired output frequency. In some embodiments, a divider control input (e.g., N) may be determined from a look-up table based on a channel indicated by the applications processor 502.

Synthesizer circuitry 506*d* of the RF circuitry 506 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 506*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 506 may include an IQ/polar converter.

FEM circuitry 508 may include a receive signal path which may include circuitry configured to operate on RF signals received from one or more antennas 510, amplify the received signals and provide the amplified versions of the received signals to the RF circuitry 506 for further processing. FEM circuitry 508 may also include a transmit signal path which may include circuitry configured to amplify signals for transmission provided by the RF circuitry 506 for transmission by one or more of the one or more antennas 510.

In some embodiments, the FEM circuitry 508 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 506). The transmit signal path of the FEM circuitry 508 may include a power amplifier (PA) to amplify input RF signals (e.g., provided by RF circuitry 506), and one or more filters to generate RF signals for subsequent transmission (e.g., by one or more of the one or more antennas 510.

In some embodiments, the UE device 500 may include additional elements such as, for example, memory/storage, display, camera, sensor, and/or input/output (I/O) interface.

EXAMPLES

The following examples pertain to further embodiments.

Example 1 is a UE that is configured to receive a request from a first peer UE to communicate with a target user corresponding to the second peer UE. The UE is configured to determine that the second peer UE is within a communication range of the UE. The UE is configured to, in response to receiving the request, relay IP packets from the first peer UE to the second peer UE and relay IP packets from the second peer UE to the first peer UE.

In Example 2, the request from the first peer UE in Example 1 includes a request for link establishment or link update with the UE.

In Example 3, the request for link establishment or link update from the first peer UE in Example 2 includes an indication that the request is for communication with the target user corresponding to the second peer UE.

In Example 4, the UE in any of Examples 1-3 is configured to send a link establishment request or link update request to the second peer UE in response to determining that the second peer UE corresponds to the target user.

In Example 5, the UE in any of Examples 1-4 is further configured to act as one or more of a DHCP server and a default IP router for communication between the first peer UE and the second peer UE.

In Example 6, the UE in Example 5 is configured to transmit assigned IP version 4 addresses to the first peer UE and the second peer UE.

In Example 7, the UE in Example 6 is configured to transmit an IP address for the first peer UE and an IP address for the second peer UE to the second peer UE in a link establishment request or link update request.

In Example 8, the UE in Example 6 is configured to transmit the IP address for the first peer UE and the IP address for the second peer UE to the first peer UE in a link establishment response or link update response.

In Example 9, the UE in any of Examples 1-8 is further configured to perform a discovery procedure to discover the first peer UE and the second peer UE and to discover user information corresponding to each of the first peer UE and the second peer UE.

Example 10 is a baseband processor that includes logic configured to determine that a relay peer communication device is available for communication with a remote peer communication device. The baseband processor includes logic configured to prepare a message to the relay peer communication device. The message to the relay peer communication device includes a request to communicate with the remote communication device. The remote communication device is outside a communication range of a device corresponding to the baseband processor and the remote communication device is within a communication range of the relay peer communication device. The baseband processor includes logic configured to format a packet for transmission to the remote communication device via the relay peer communication device.

In Example 11, the baseband processor of Example 10 further includes logic configured to decode a response from the relay UE indicating that the relay UE accepts the request to communicate with the remote communication device, wherein the logic configured to format an IP packet for transmission to the remote communication device via the relay UE is configured to format the IP packet in response to decoding the response from the relay UE.

In Example 12, the baseband processor of any of Examples 10-11 further includes logic configured to decode one or more messages indicating an IP address for the remote communication device and an IP address for the device corresponding to the baseband processor.

In Example 13, the baseband processor of any of Examples 10-12 further includes logic configured to perform service discovery to discover an IP address of the remote communication device, wherein the logic configured to format an IP packet for transmission to the remote communication device via the relay UE is configured to format the IP packet in response to discovering the IP address of the remote communication device.

In Example 14, the baseband processor of any of Examples 10-13 further includes logic configured to determine that the device corresponding to the baseband processor is out of network coverage.

In example 15, the baseband processor of any of Examples 10-14 further includes logic configured to perform peer relay discovery to discover remote user information corresponding to the remote peer communication device.

Example 16 is a UE that includes a decode component, a remote component, an IP address component, and a communication component. The decode component is configured to process a message from a proximate UE comprising a direct communication request to communicate with a remote UE. The remote component is configured to transmit a message to the proximate UE indicating acceptance of the direct communication request to communicate with the remote UE. The IP address component is configured to determine an IP address assigned to the UE by the proximate UE. The communication component is configured to communicate with the remote UE via the proximate UE.

In Example 17, the message from the proximate UE in Example 16 includes a link establishment request and wherein the message to the proximate UE indicating acceptance comprises a link establishment response.

In Example 18, the message from a proximate UE in any of Examples 16-17 includes an indication that the request is for communication with a source user corresponding to the remote UE.

In Example 19, the IP address component in any of Examples 16-18 is further configured to perform service discovery to determine an IP address for the remote UE.

In Example 20, the message from the proximate UE in any of Examples 16-19 includes an IP version 4 address for the UE assigned by the proximate UE and an IP version 4 address for the remote UE assigned by the proximate UE. The communication component is configured to determine the IP address assigned to the UE based on the message from the proximate UE and the communication component is configured to send packets to the remote UE using the IP version 4 address for the remote UE assigned by the proximate UE.

Example 21 is a method that includes receiving, at a relay UE, a request from a first peer UE to communicate with a target user corresponding to the second peer UE. The method includes determining that the second peer UE is within a communication range of the relay UE. The method includes, in response to receiving the request, relaying IP packets from the first peer UE to the second peer UE and relay IP packets from the second peer UE to the first peer UE.

In Example 22, the request from the first peer UE in Example 21 includes a request for link establishment or link update with the relay UE.

In Example 23, the request for link establishment or link update from the first peer UE in Example 22 includes an indication that the request is for communication with the target user corresponding to the second peer UE.

In Example 24, the method in any of Examples 21-23 further includes sending, from the relay UE, a link establishment request or link update request to the second peer UE in response to determining that the second peer UE corresponds to the target user.

In Example 25, the method in any of Examples 21-24 further includes acting as one or more of a DHCP server and a default IP router for communication between the first peer UE and the second peer UE.

In Example 26, the method in any of Examples 21-24 further includes transmitting, from the relay UE, an assigned IP version 4 addresses to the first peer UE and the second peer UE.

In Example 27, the method in Example 26 further includes transmitting, from the relay UE, an IP address for the first peer UE and an IP address for the second peer UE to the second peer UE in a link establishment request or link update request.

In Example 28, the method in Example 26 further includes transmitting, from the relay UE, the IP address for the first peer UE and the IP address for the second peer UE to the first peer UE in a link establishment response or link update response.

In Example 29, the method in any of Examples 21-28 further includes performing a discovery procedure to discover the first peer UE and the second peer UE and to discover user information corresponding to each of the first peer UE and the second peer UE.

Example 30 is a method that includes determining, at a first communication device, that a relay peer communication device is available for communication with a remote peer communication device. The method includes preparing a message to the relay peer communication device, the message to the relay peer communication device comprising a request to communicate with the remote communication device. The remote communication device is outside a communication range of the first communication device and wherein the remote communication device is within a communication range of the relay peer communication device. The method includes formatting a packet for transmission to the remote communication device via the relay peer communication device.

In Example 31, the method of Example 30 further includes decoding a response from the relay UE indicating that the relay UE accepts the request to communicate with the remote communication device, wherein formatting an IP packet for transmission to the remote communication device via the relay UE comprises formatting the IP packet in response to decoding the response from the relay UE.

In Example 32, the method in any of Examples 30-31 further includes decoding one or more messages indicating an internet protocol (IP) address for the remote communication device and an IP address for the first communication device.

In Example 33, the method in any of Examples 30-32 further includes performing service discovery to discover an IP address of the remote communication device, wherein formatting an IP packet for transmission to the remote communication device via the relay UE comprises formatting the IP packet in response to discovering the IP address of the remote communication device.

In Example 34, the method in any of Examples 30-33 further includes determining that the device corresponding to the first communication device is out of network coverage.

In Example 35, the method in any of Examples 30-34 further includes performing peer relay discovery to discover remote user information corresponding to the remote peer communication device.

Example 36 is a method that includes processing a message from a proximate UE including a direct communication request to communicate with a remote UE. The method include transmitting a message to the proximate UE indicating acceptance of the direct communication request to communicate with the remote UE. The method includes determining an IP address assigned to the UE by the proximate UE. The method includes communicating with the remote UE via the proximate UE.

In Example 37, the message from the proximate UE in Example 36 includes a link establishment request and wherein the message to the proximate UE indicating acceptance comprises a link establishment response.

In Example 38, the message from a proximate UE in any of Examples 36-37 includes an indication that the request is for communication with a source user corresponding to the remote UE.

In Example 39, the method of any of Example 36-38 the method further includes performing service discovery to determine an IP address for the remote UE.

In Example 40, the message from the proximate UE in any of Examples 36-39 includes an IP version 4 address for the UE assigned by the proximate UE and an IP version 4 address for the remote UE assigned by the proximate UE, wherein the method comprises determining the IP address assigned to the UE based on the message from the proximate UE and sending packets to the remote UE using the IP version 4 address for the remote UE assigned by the proximate UE.

Example 41 is an apparatus including means to perform a method as in any of Examples 21-40.

Example 42 is at least one computer-readable storage medium having stored thereon computer-readable instructions which, when executed, implement a method or realize an apparatus as in any of Examples 21-41.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or an interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present invention. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present invention may be referred to herein along with alternatives for the various components thereof. It is understood that such embodiments, examples, and alternatives are not to be construed as de facto equivalents of one another, but are to be considered as separate and autonomous representations of the present invention.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the invention is not to be limited to the details given herein, but may be modified within the scope and equivalents of the appended claims.

Those having skill in the art will appreciate that many changes may be made to the details of the above-described embodiments without departing from the underlying principles of the invention. The scope of the present invention should, therefore, be determined only by the following claims.

The invention claimed is:

1. A user equipment (UE) configured to:
   receive a relay discovery request from a first peer UE, wherein the relay discovery request includes an identifier that identifies a second peer UE;
   determine that the second peer UE is within a communication range of the UE;
   in response to the relay discovery request and that the second peer UE is within the communication range of the UE, transmit a first IP address for the first peer UE and a second IP address for the second peer UE to the second peer UE in a link establishment request or a link update request, wherein the first IP address is different than the second IP address;
   establish a first link with the first peer UE;
   establish a second link with the second peer UE based on the request; and
   based on the first IP address and the second IP address, relay internet protocol (IP) packets from the first peer UE to the second peer UE and relay IP packets from the second peer UE to the first peer UE.

2. The UE of claim 1, wherein the relay discovery request from the first peer UE comprises a request for link establishment or link update with the UE.

3. The UE of claim 2, wherein the request for link establishment or link update from the first peer UE comprises an indication that the request is for communication with the second peer UE.

4. The UE of claim 1, wherein the UE is configured to send a link establishment request or link update request to the second peer UE.

5. The UE of claim 1, wherein the UE is further configured to act as one or more of a dynamic host configuration protocol (DHCP) server and a default internet protocol (IP) router for communication between the first peer UE and the second peer UE.

6. The UE of claim 5, wherein the UE is configured to transmit assigned IP version 4 addresses to the first peer UE and the second peer UE.

7. The UE of claim 1, wherein the UE is configured to transmit the IP address for the first peer UE and the IP address for the second peer UE to the first peer UE in a link establishment response or link update response.

8. The UE of claim 1, wherein the UE is further configured to perform a discovery procedure to discover the first peer UE and the second peer UE and to discover user information corresponding to each of the first peer UE and the second peer UE.

9. User equipment (UE) comprising:
   a processor;
   a memory in electronic communication with the processor; and
   instructions stored in the memory that when executed by the processor cause the processor to:
      process a message from a proximate UE comprising a direct communication relay discovery request to communicate with a remote UE, wherein the message includes an identifier that identifies the remote UE, and wherein the message further comprises a link establishment request;
      transmit a message to the proximate UE indicating acceptance of the direct communication relay discovery request to communicate with the remote UE;
      determine a first internet protocol (IP) address assigned to the remote UE by the proximate UE and a second IP address assigned to the UE by the proximate UE using information included in the link establishment request, wherein the first IP address is different than the second IP address; and
      using the first IP address and the second IP address, communicate with the remote UE via the proximate UE.

10. The UE of claim 9, wherein the message to the proximate UE indicating acceptance comprises a link establishment response.

11. The UE of claim 9, wherein the message from a proximate UE comprises an indication that the direct communication relay discovery request is for communication with a source user corresponding to the remote UE.

12. The UE of claim 9, wherein the instructions are further executable by the processor to perform service discovery to determine an IP address for the remote UE.

13. The UE of claim 9, wherein the message from the proximate UE comprises an IP version 4 address for the UE assigned by the proximate UE and an IP version 4 address for the remote UE assigned by the proximate UE, wherein the instructions are further executable by the processor to determine an IP address assigned to the UE based on the message from the proximate UE and wherein the instructions are further executable by the processor to send packets to the remote UE using the IP version 4 address for the remote UE assigned by the proximate UE.

* * * * *